(12) United States Patent
Turnquist et al.

(10) Patent No.: US 8,113,771 B2
(45) Date of Patent: Feb. 14, 2012

(54) SPRING SYSTEM DESIGNS FOR ACTIVE AND PASSIVE RETRACTABLE SEALS

(75) Inventors: Norman Arnold Turnquist, Sloansville, NY (US); Shorya nmn Awtar, Ann Arbor, MI (US); Mustafa Gursoy, Cankaya Ankara (TR); Kartik Mangudi Varadarajan, Cambridge, MA (US)

(73) Assignee: General Electric Company, Schenectady, NY (US)

( * ) Notice: Subject to any disclaimer, the term of this patent is extended or adjusted under 35 U.S.C. 154(b) by 385 days.

(21) Appl. No.: 12/408,236

(22) Filed: Mar. 20, 2009

(65) Prior Publication Data
US 2010/0239415 A1  Sep. 23, 2010

(51) Int. Cl.
*F01D 5/20* (2006.01)
*F01D 11/08* (2006.01)
*F04D 29/08* (2006.01)
*F04D 29/18* (2006.01)

(52) U.S. Cl. .............. 415/173.3; 415/170.1; 277/53; 277/411; 277/413; 277/421

(58) Field of Classification Search .............. 415/173.3, 415/174.5, 170.1, 229; 277/411, 413, 421, 277/53
See application file for complete search history.

(56) References Cited

U.S. PATENT DOCUMENTS

| 4,436,311 | A | | 3/1984 | Brandon |
| 5,002,288 | A | * | 3/1991 | Morrison et al. ............. 277/413 |
| 5,395,124 | A | * | 3/1995 | Brandon ............. 277/413 |
| 5,603,510 | A | * | 2/1997 | Sanders ............. 277/413 |
| 5,810,365 | A | | 9/1998 | Brandon et al. |
| 6,022,027 | A | | 2/2000 | Chevrette et al. |
| 6,572,115 | B1 | | 6/2003 | Sarshar et al. |
| 6,651,986 | B2 | | 11/2003 | Chevrette et al. |
| 6,655,696 | B1 | | 12/2003 | Fang et al. |
| 6,695,316 | B2 | | 2/2004 | Popa et al. |
| 6,715,766 | B2 | | 4/2004 | Kirby, III et al. |
| 6,786,487 | B2 | | 9/2004 | Dinc et al. |

FOREIGN PATENT DOCUMENTS

| EP | 1503045 A2 | 2/2005 |
| EP | 1942294 A1 | 7/2008 |
| WO | 2005031197 A1 | 4/2005 |

OTHER PUBLICATIONS

Search Report and Written Opinion, GB1004288.5, Jun. 25, 2010.
U.S. Appl. No. 11/652,076, filed Jan. 11, 2007.
U.S. Appl. No. 12/025,097, filed Feb. 4, 2008.

* cited by examiner

*Primary Examiner* — David Nhu
(74) *Attorney, Agent, or Firm* — Nixon & Vanderhye, P.C.

(57) ABSTRACT

A spring assembly for a retractable turbine rotor seal supported in an arcuate segment may include in one embodiment a first radially inner restraining plate having a lower surface adapted to engage a surface of a turbine stator, and a flat upper surface provide with an upstanding hub; a second radially outer restraining plate having a flat lower surface and an upper surface adapted to engage a surface of the arcuate segment, the radially outer restraining plate formed with an opening receiving the upstanding hub; and at least one spring telescoped over the upstanding hub and exerting a radially outward biasing force on the second radially outer restraining plate, and adapted to exert a radially outward retracting force on the arcuate segment.

18 Claims, 8 Drawing Sheets

SPRING SYSTEM DESIGNS FOR ACTIVE AND PASSIVE RETRACTABLE SEALS

BACKGROUND OF THE INVENTION

The present invention relates to retractable seals for rotary machines such as steam turbines, gas turbines, aircraft engines, compressors and the like.

Rotary machines such as steam and gas turbines used for power generation and mechanical drive applications, aircraft engines used for propulsion, and compressors used for pressurization are generally very large machines consisting of multiple turbine and compressor stages. In such machines, pressurized fluid flowing through the turbine and/or compressor stages passes through a series of stationary and rotary components. In a typical steam turbine, the stationary components may include a machine casing and a packing head, and the rotary component may be a rotor supporting a plurality of bladed wheels.

Annular seals mounted on the stationary components are used to control leakage of fluid along the path between the stationary and rotary components. In fact, the efficiency of the turbine is directly dependent on the ability of these seals to prevent such leakage. These seals can be radial or axial in orientation, and can be one of several kinds such as labyrinth packing seals, leaf seals, abradable seals, compliant plate seals, etc. Radial seals are often segmented (i.e., divided into plural arcuate segments which together surround the rotor) for assembly reasons and/or for displacement in the radial direction. While such radial, segmented labyrinth seals have proved to be quite reliable in steam turbines, their performance degrades over time as a result of transient events in which the stationary and rotary components interfere, rubbing the labyrinth teeth into "mushroom" profiles and opening the seal clearances. Similarly, near-contact seals such as brush seals and compliant plate seals can possibly contact the rotor during transient events leading to wear and heat generation. Heat generation, in turn, can cause rotordynamic instabilities, which are detrimental to the machine's operation and performance.

One means of reducing the negative effects of rubs or contact during transient events has been to employ a variable clearance "positive-pressure" (VCPP) arrangement, in which springs are used to hold the seal segments open at a large running clearance under no or low-flow transient conditions, when such rubbing is most likely to occur. During steady-state conditions, when the machine is typically operating at a higher load with higher fluid pressures, the ambient pressure around the seal segment overcomes the spring force acting to close the rings to a close running clearance. Examples of known variable clearance positive-pressure (VCPP) labyrinth seals may be found in U.S. Pat. Nos. 6,695,316; 6,022,027; 5,810,365; 5,603,510; 5,002,288; and 4,443,311.

Variable clearance positive-pressure arrangements, however, employ segmented seals that respond solely to the machine load. Once the machine reaches a design load and pressure, the packing ring segments close and remain closed until the machine load, and therefore the fluid pressure inside the machine, drops adequately. Thermal transients may persist, however, even after the design load has been reached. Therefore, it is ideally desired that the seal segments remain open until the thermal transients subside. Furthermore, VCPP seals are susceptible to rubbing in case of rotor vibrations during steady-state operation, when the seal segments are forced closed by the ambient fluid pressure. In such circumstances, current VCCP arrangements are not effective in avoiding rubs since they are passive systems.

A further enhancement to this concept is achieved via the "Active Retractable Seals" technology, which allows packing-ring segments to be retracted actively during an operating condition of the turbo-machine and not just start-up and shut-down. This is accomplished by providing a flow bypass that neutralizes the pressure drop across the seal segments in question. By eliminating or reducing the pressure drop across the seal segments in this fashion, the fluid-pressure force (which is radially inwards for a radial seal configuration) on the seal segments is effectively reduced and the seal segments are retracted (radially outward for a radial seal configuration) by preloaded springs. Exemplary prior art is described in U.S. Pat. Nos. 6,786,487; 6,655,696; 6,572,115 and 6,502,823.

There remains a need for reliable spring designs for both passive and active retractable seals that keep the packing ring segments open or retracted in the absence of a pressure drop across the packing ring.

BRIEF SUMMARY

In one exemplary but non-limiting example, there is provided a spring assembly for a retractable turbine rotor seal supported in an arcuate segment comprising: a first radially inner restraining plate having a lower surface adapted to engage a surface of a turbine stator, and a flat upper surface provide with an upstanding hub; a second radially outer restraining plate having a flat lower surface and an upper surface adapted to engage a surface of the arcuate segment, the radially outer restraining plate formed with an opening receiving the upstanding hub; and at least one spring telescoped over the upstanding hub and exerting a radially outward biasing force on the second radially outer restraining plate, and adapted to exert a radially outward retracting force on the arcuate segment.

In another exemplary but nonlimiting example, there is provided a spring assembly for a retractable turbine rotor seal supported in an arcuate segment comprising: a radially inner spring carrier plate having a radially inner surface adapted to engage a surface of a turbine stator, and a radially outer surface having a recess formed therein; at least one spring seated in the recess; and a button plate supported on the one or more springs, the button plate having a radially outer surface adapted to engage a surface of the arcuate segment, wherein the at least one spring exerts a radially outward force on the button plate and is adapted to exert a radially outward force on the arcuate segment.

In another exemplary embodiment, there is provided a turbine rotor and stator assembly incorporating a retractable seal, the assembly comprising: a stator formed with an annular slot defined in part by opposed hooks forming a relatively narrow neck providing an entry to the slot; a plurality of arcuate seal segments, each arcuate seal segment having a mounting flange seated in the slot and a sealing face located exterior to the slot and supporting a plurality of seal elements, the arcuate seal segments adapted to move radially toward and away from the rotor; and wherein each arcuate seal segment is biased in a radially outward direction by plural leaf or strip springs engaged between the each arcuate seal segment and the stator.

Exemplary embodiments of the invention will now be described in detail in connection with the drawings identified below.

DETAILED DESCRIPTION OF THE DRAWINGS

Figure 1:
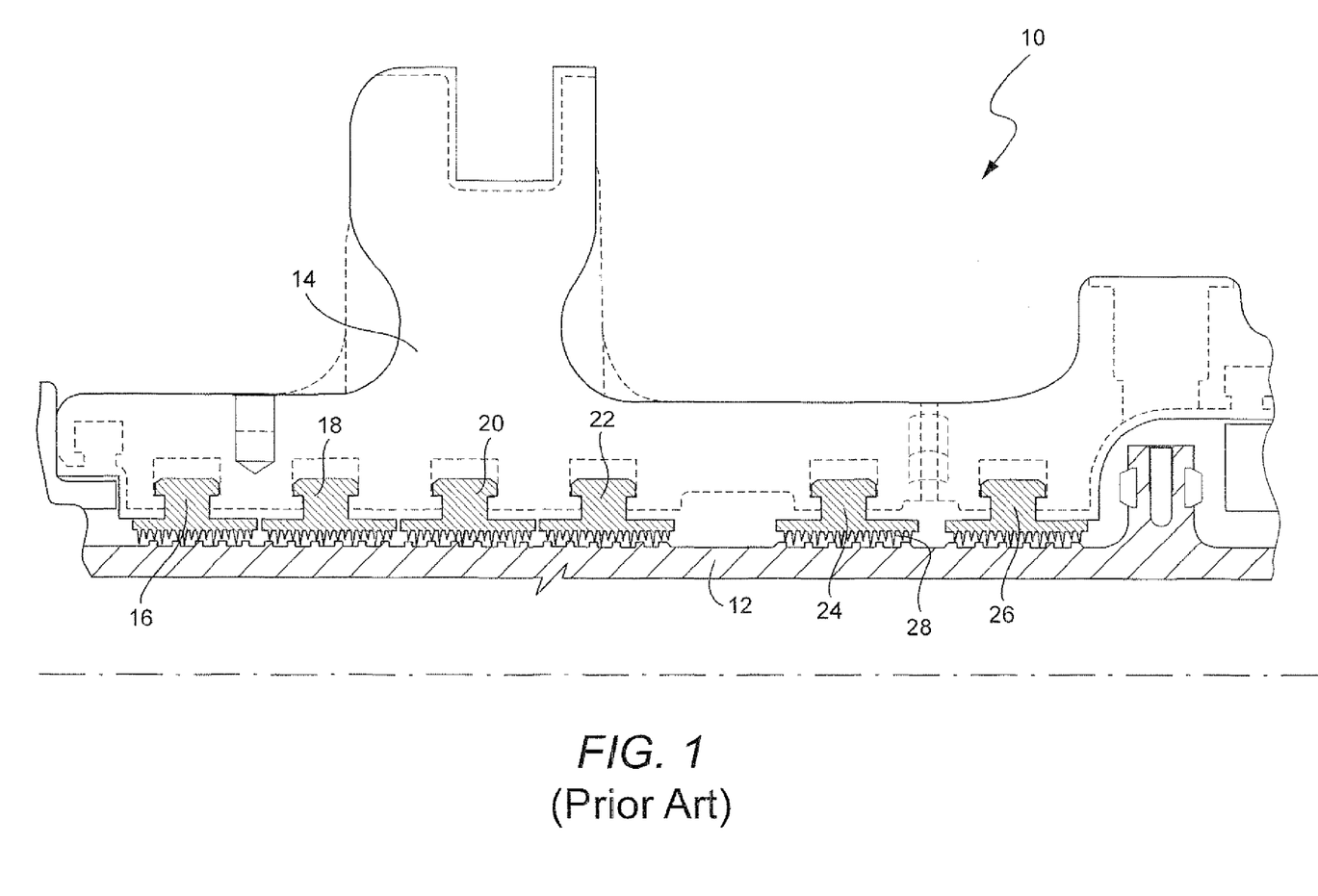
FIG. 1 is a partial sectional view of a turbine rotor labyrinth seal configuration.

With initial reference to FIG. 1, a typical turbo machine segmented, labyrinth seal assembly 10 is partially shown in the context of a rotor 12 and a casing or packing head 14. Plural labyrinth packing seal rings 16, 18, 20, 22, 24 and 26 are shown mounted within the packing head 14 at axially spaced locations along the rotor 12. Each seal ring is comprised of plural arcuate segments (at least two but typically four or more) that extend around the circumference of the rotor. When the seal rings are labyrinth seals, each seal segment typically includes a plurality of teeth 28 that are disposed in opposition to circumferential portions of the rotor 12 which may be alternately stepped up and down in radius. This invention is not limited, however, to any particular labyrinth tooth arrangement. In fact, the spring arrangements described herein are applicable to a variety of seals, including but not limited to labyrinth packings (including straight tooth, slant tooth and Vernier packings), brush seals, compliant plate seals, shingle seals, honeycomb seals, and abradable seals. The spring/seal arrangements are also applicable at any sealing location including but not limited to end packings (shown in FIG. 1), inter-stage sealing, tip sealing, etc., and are inclusive of annular, non segmented axially movable seals.

Figure 2:
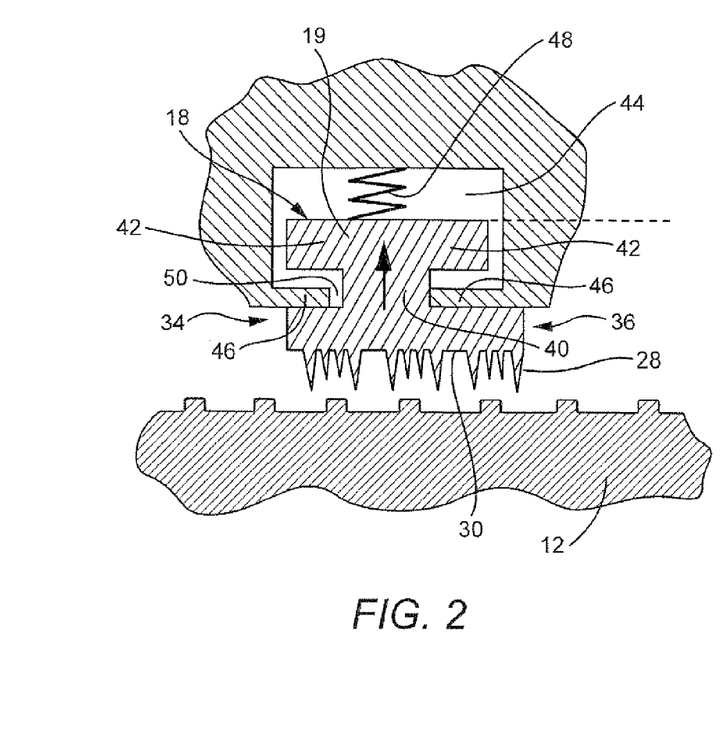
FIG. 2 is a schematic representation of a known, retractable labyrinth seal configuration with the seal shown in an open or retracted state.

FIG. 2 is an enlarged cross-section of the seal ring 18 generally similar to those shown in FIG. 1, but in a more schematic form, useful in discussing the unique aspects of the present invention. As indicated above, the seal ring 18 is formed by a plurality of arcuate segments 19, each having a sealing face 30, with the teeth or other seal elements 28 projecting radially inwardly therefrom. A high-pressure region 34 on one side of the ring is separated from a low-pressure region 36 on the other side of the ring by the "seal joint". Typically, the seal segment illustrated in FIGS. 1-3 functions by presenting a relatively large number of barriers (e.g., teeth 28) to the axial flow of fluid, between the seal segment 19 and the rotor 12, from the higher pressure region to the lower pressure region.

Figure 3:
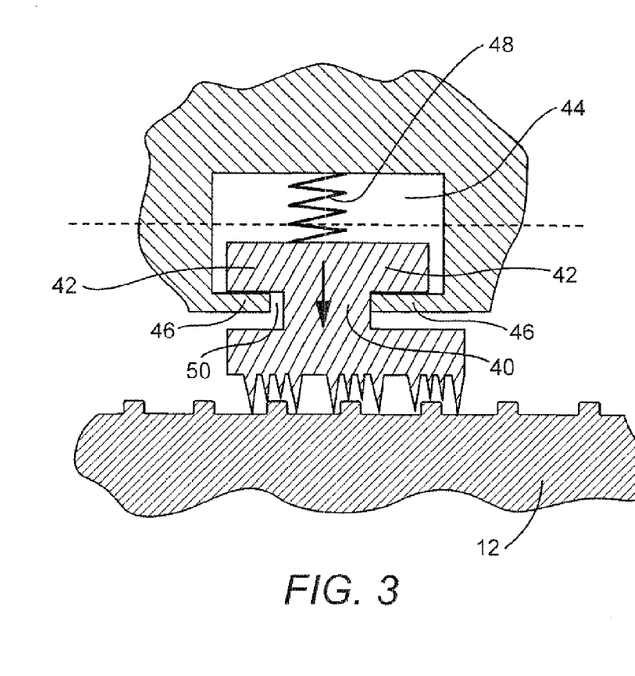
FIG. 3 is a schematic representation of a known, retractable labyrinth seal configuration with the seal shown in a closed or extended state.

Typically, the seal segments have a necked-in center portion 40 with flanges 42 at the end opposite the sealing face 30. A packing head cavity 44 is shaped to include opposed hooks 46 received within the necked-in portion 40, thus mounting the seal segments for radially inward and outward movement, toward and away from the rotor 12. One or more springs 48 are employed to nominally bias the seal ring segment to a radially retracted or open position. These springs hold the ring segments 19 in an open or retracted position during no-flow or low-flow conditions, such as startup or shutdown. As the turbine is brought up to operating load, the upstream high-pressure process fluid (e.g., steam or the gaseous products of combustion) enters the cavity 44 via gap 50 or other features (e.g., conventionally arranged feed holes), such that the pressure force overcomes the spring force, moving the seal segment 19 radially inwardly toward the rotor 12 to a close running clearance as shown in FIG. 3. This is a conventional VCPP arrangement, well understood in the turbine art.

Turning to FIGS. 4-7, an exemplary implementation of the present invention incorporates a unique spring assembly for normally biasing the packing ring segment to an open or retracted state. More specifically, the spring assembly 52 includes a first radially inner restraining plate 54 having a lower surface 56 adapted to engage a surface of a turbine stator. These engaging surfaces could be arcuate or straight (within an arcuate seal ring and casing). The first restraining plate 54 is formed with a flat upper surface 58 provided with an upstanding hub or boss 60 adapted to receive in telescoping relationship, one or more disc springs 62. In the implementation shown, three disc springs 62 are shown in back-to-back relationship.

Figure 4:
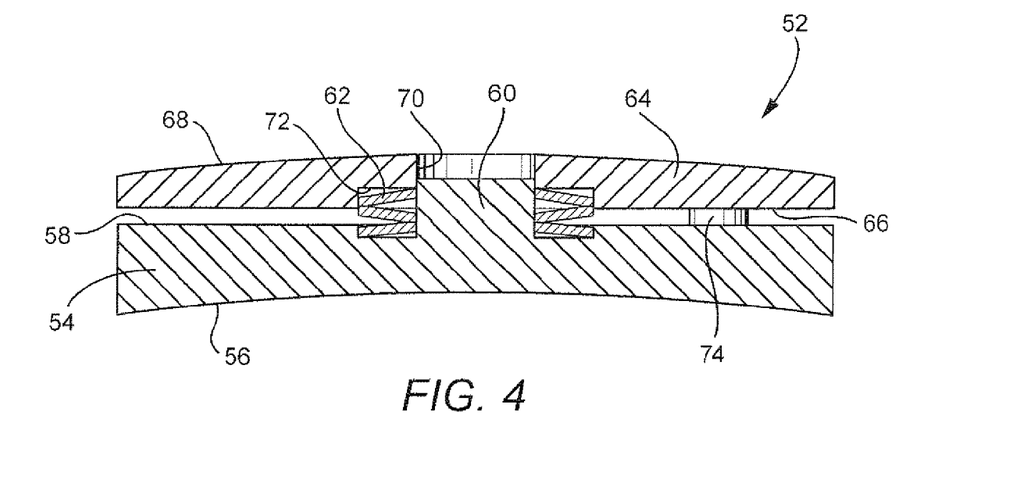
FIG. 4 is a cross-section of a spring assembly in accordance with a first exemplary but nonlimiting embodiment of the invention for use with passive and active retractable seals.

A second radially outer restraining plate 64 is formed with a flat lower surface 66 and an arcuate upper surface 68 adapted to engage a surface of an arcuate packing segment. This second restraining plate is formed with a center opening 70 that is adapted to receive the upstanding hub 60 of the first restraining plate. The center opening 70 is counter-bored from the underside so that at least one of the disc springs is received within the counter bore 72 as best seen in FIG. 4.

The upper flat surface 58 of the first (or lower) restraining plate 54 is also formed with a pin 74 that is adapted to be received within a hole 76 formed in the second (or upper) restraining plate 64. The pin-in-hole arrangement will be understood to prevent relative rotation between the first and second restraining plates.

The number and arrangement of springs 62 is application specific, e.g., they may be stacked to effectively act in series or parallel to achieve the desired stiffness and displacement. In the embodiment shown, the three disc springs 62 are stacked so as to act in series. It will be appreciated, of course, that other spring types may be employed, for example, coil springs.

Figure 5:
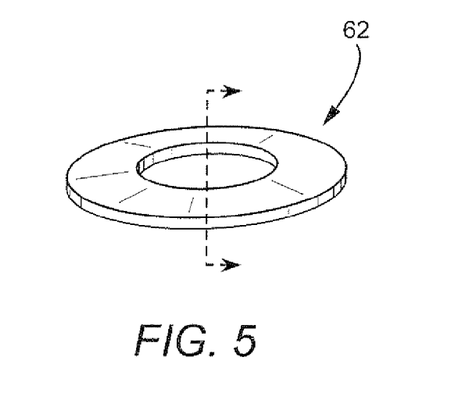
FIG. 5 is a perspective view of a disc spring used in the spring assembly of FIG. 3.
Figure 6:
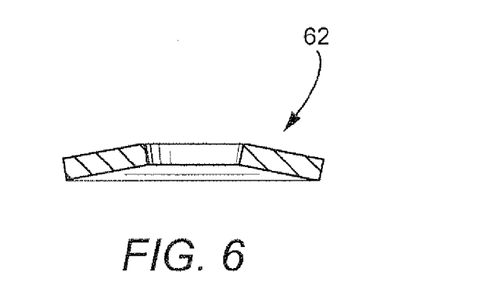
FIG. 6 is a cross-section through the disc spring of FIG. 5.

The disc springs 62 themselves are of conventional construction, with a generally dome-shape as viewed, for example, in FIGS. 5 and 6.

Figure 7:
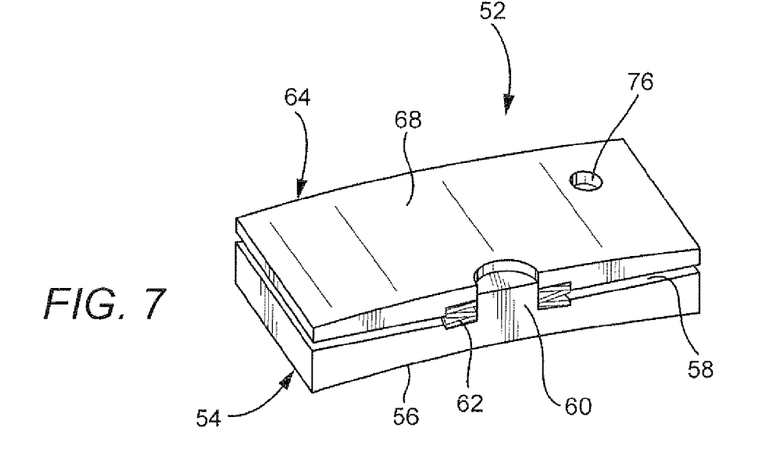
FIG. 7 is a perspective view, partially cut away, of the spring assembly shown in FIG. 3.

FIG. 7 illustrates the assembly 52 split along the centerline of the hub 60. Thus, the spring assembly may have a generally square-shape when viewed in plan, but it will be appreciated that the size and shape of the spring assembly may vary as needed.

Figure 8:
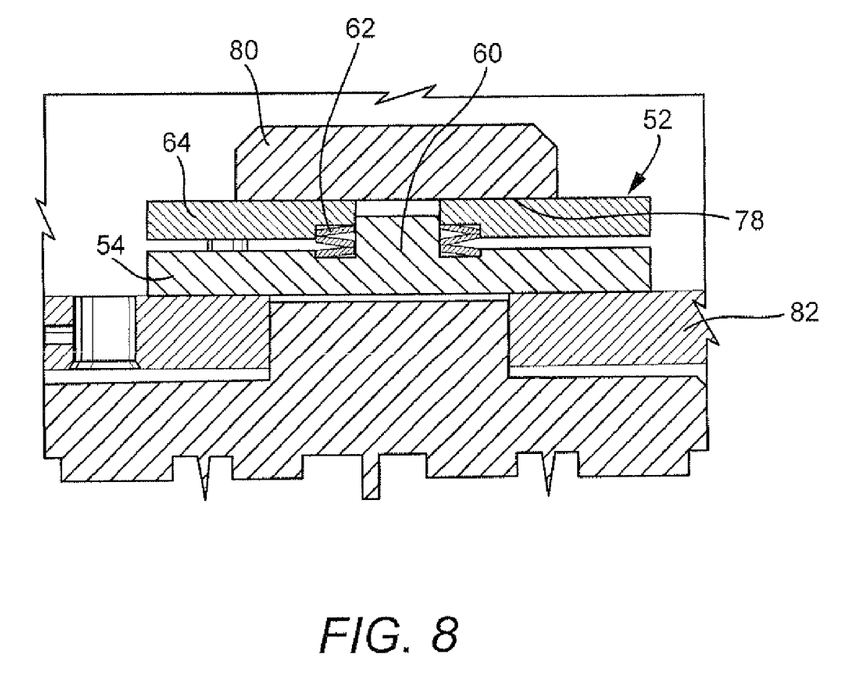
FIG. 8 is a cross-section of the spring assembly of FIG. 2 shown inserted within a slot in a turbine packing ring.
Figure 9:
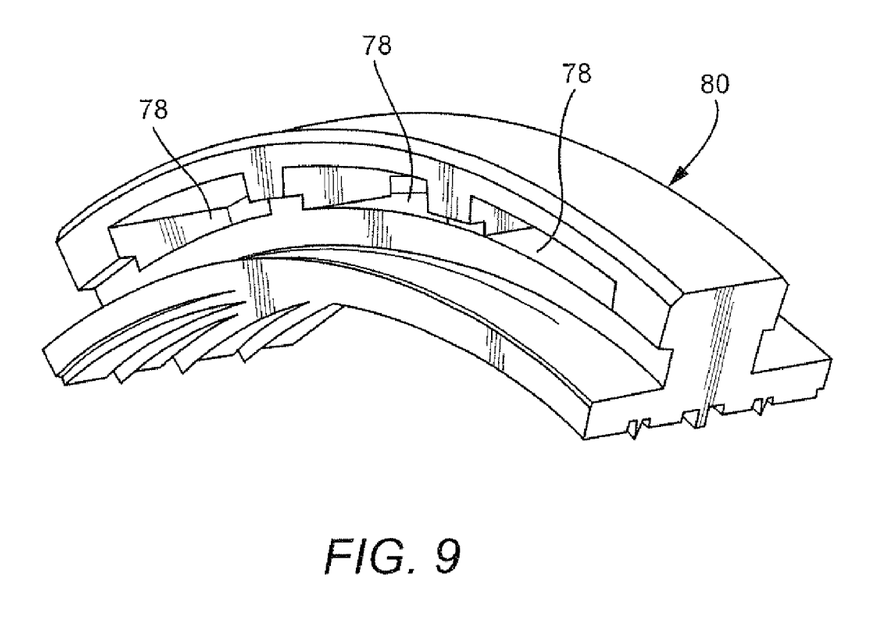
FIG. 9 is a perspective view of a seal segment showing slots adapted to receive the spring assemblies shown in FIGS. 4-8.

The spring assembly 52 described above may be installed within a slot 78 cut on the side of a packing segment 80 as best seen in FIGS. 8 and 9. The slots extend cross-wise to the arcuate segment with the lower surface of the first restraining plate engaged with the curved surface of the stator hook 82, and the upper surface of the second restraining plate engaged with the upper portion of the packing segment, such that the spring biases the arcuate segment regularly outwardly to a retracted state.

Figure 10:
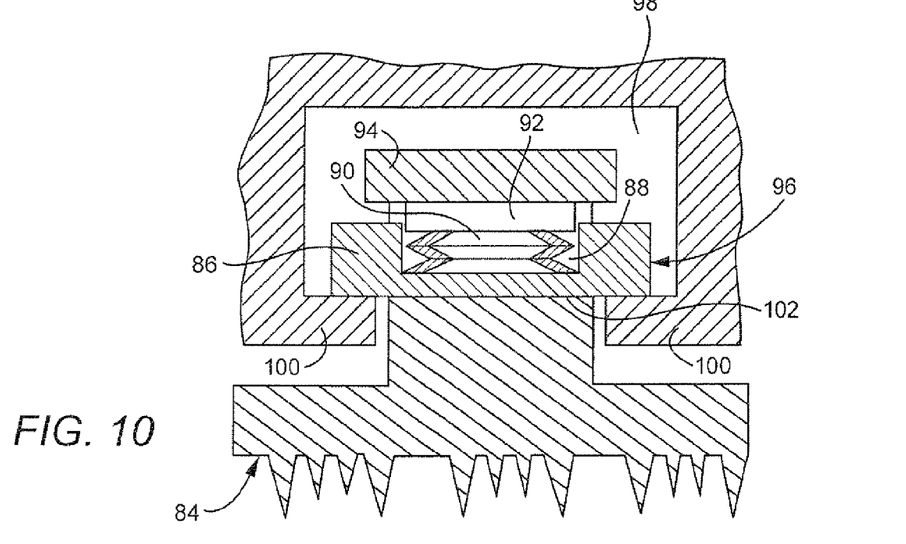
FIG. 10 is a cross-sectional view of a disc spring assembly in accordance with a second exemplary but nonlimiting embodiment of the invention, also inserted within a slot in the packing ring.

FIG. 10 illustrates another exemplary implementation, but note that the seal teeth have been omitted from the packing segment 84. In this embodiment, a spring carrier 86 (generally corresponding to the first restraining plate described above) is provided with a center recess 88 which receives one or more disc springs 90 similar to those described above. In this embodiment, the radially outer spring bears against a disc or button 92 which, in turn, engages the radially outer end 94 of the packing ring 84. It will be appreciated that the one or more disc springs may be replaced by one or more coil springs but in either case, the button or disc 92 is free to move vertically with respect to the spring carrier 86. Thus, the combination of spring carrier, spring elements (disc springs or coil springs) and button constitute a spring module (or spring assembly) 96. One or more of these spring modules may be assembled in the packing ring cavity 98 as shown in FIG. 10. In the overall assembly, the carrier plate 86 nominally rests on the stator hooks 100. In the retracted condition, the packing ring lifts from the top face of the spring carrier and is in contact with the bottom face 102 of the spring carrier as shown in FIG. 10. In the closed condition or state, the packing ring rests on the top face of the spring carrier, creating a gap below the bottom face of the spring case. The height of the button 92 may be varied to adjust the preload provided by the springs 90, which otherwise affects the pressure drop at which the packing ring segment 84 opens and closes.

Figure 11:
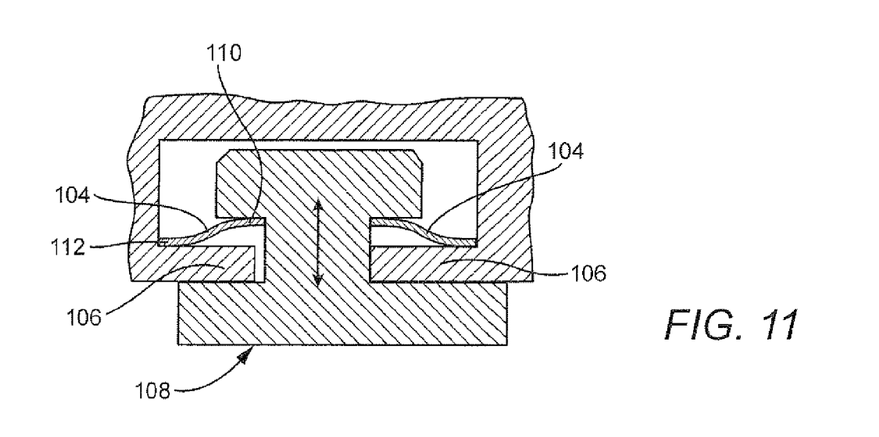
FIG. 11 is a cross-sectional view of a third exemplary but nonlimiting embodiment of a packing ring seal utilizing metal strip springs.
Figure 12:
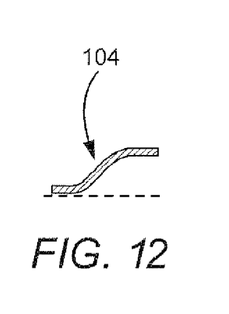
FIG. 12-14 are cross-sectional views of possible strip spring configurations usable in the arrangement shown in FIG. 11.

FIG. 11 illustrates yet another exemplary implementation, wherein springs 104 located between the stator hooks 106 and packing ring segment 108 are in the nature of strip or leaf springs that can be spot welded or otherwise attached to the packing segment 108 or stator hooks to prevent circumferential motion. Sufficient clearance may be provided between the spring and the stator housing to allow for axial motion of the packing segment and that of the spring arising from its compression. Various cross-sectional shapes for the spring are possible and may be optimized for best performance. Thus, with reference to FIGS. 12, 13 and 14, the springs 104 may have a generally S-shaped configuration as shown in FIGS. 11 and 12, with one end 110 spot welded to the underside of the segment flange, and with the opposite end 112 free to move in either of two opposite directions, depending on direction of movement of the segment.

Figure 13:
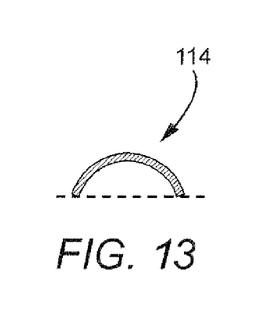
Figure 14:
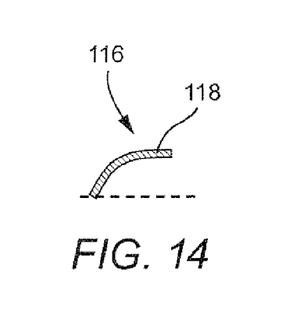

FIG. 13 illustrates a variation wherein the spring 114 takes on a substantially semi-circular cross sectional shape. In FIG. 14, the spring 116 has a shape is somewhat similar to FIG. 12, but with the flat portion adapted to engage the stator hook eliminated, leaving end 118 for attachment to the underside of the packing segment flange.

Figure 15:
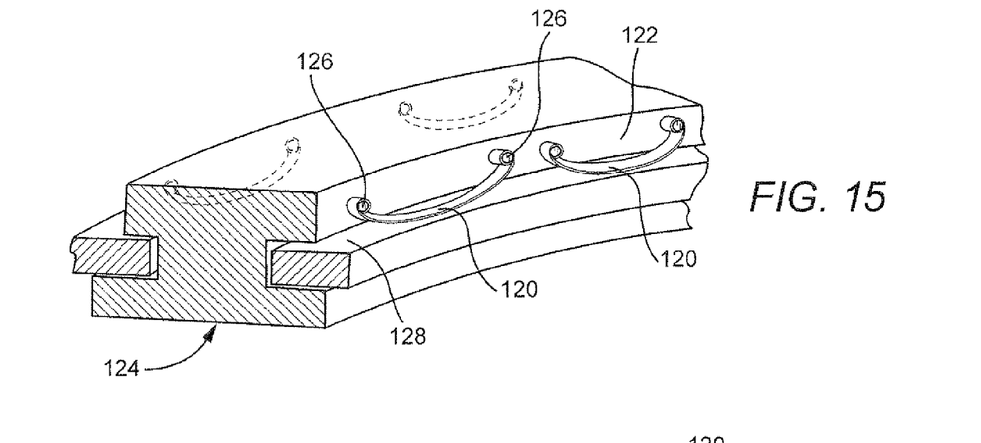
FIG. 15 is a partial perspective view of a fourth exemplary but nonlimiting embodiment of the invention utilizing curved leaf springs.

Turning now to FIG. 15, a further implementation utilizes a plurality of curved leaf springs 120 attached to a sidewall 122 of the radially outer flange portion of the packing ring segment 124. The springs 120 may be attached to the segment through the use of pins 126 (or any other suitable, equivalent means) at opposite ends of the spring, such that a curved center portion of the spring bears on the stator hook 128, urging the segment to a radially outer retracted position.

Figure 16:
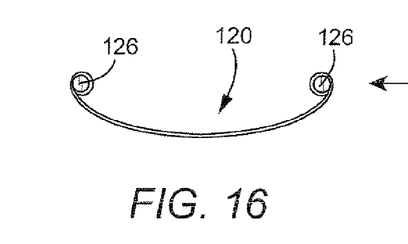
FIGS. 16-18 are end views showing alternative fixing arrangements for the springs shown in FIG. 15.
Figure 17:
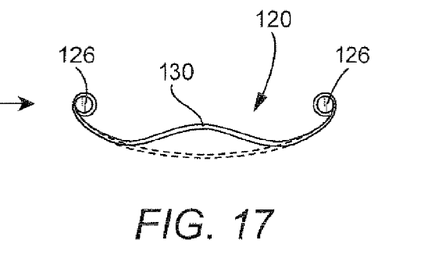

FIG. 16 isolates one of the springs shown in FIG. 15, and more clearly illustrates the fixed pin arrangement for mounting the spring to the side 122 of the seal segment. FIG. 17 illustrates how the spring deforms when the segment moves radially inwardly, causing the center portion 130 of the spring to bow in a radially outer direction.

Figure 18:
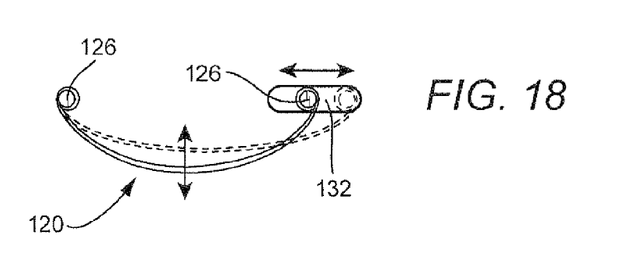

In FIG. 18, a variation is illustrated wherein one end of the spring 120 is fixed to a pin 126 movable within an elongated slot 132, resulting in a simple flattening of the spring when the segment moves radially inwardly.

Figure 19:
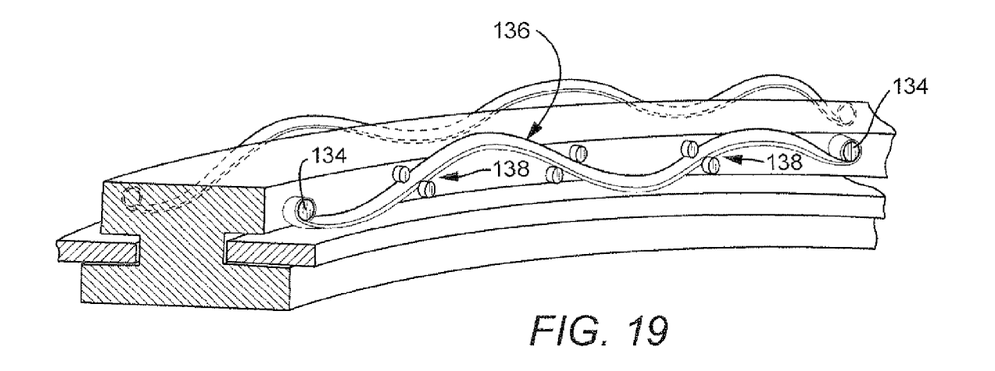
FIG. 19 is a partial perspective view of a spring arrangement in accordance with a fifth exemplary but nonlimiting embodiment.

FIG. 19 illustrates yet another embodiment of the subject invention wherein pins 134 are used to secure the ends of the spring 136 as shown in FIG. 18, but wherein intermediate pin pairs 138 are used to impart to the spring an undulating curved shape.

Figure 20:
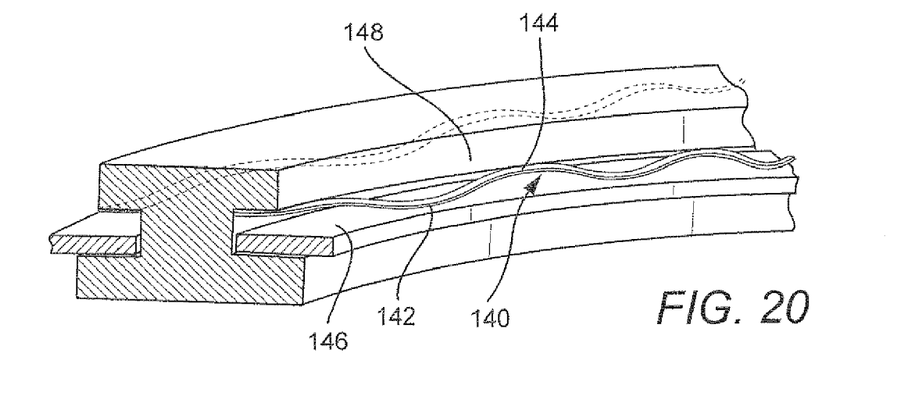
FIG. 20 is a partial perspective view of a spring arrangement in accordance with a sixth exemplary but nonlimiting embodiment.

FIG. 20 illustrates an embodiment generally similar to that shown in FIG. 19. In this instance, the spring 140 is in the nature of an undulating or a wavy spring that need not be forced into an undulating shape by the use of pins as in the FIG. 19 embodiment. Undulations 142, 144, etc., alternatively engage the stator hooks 146 and segment flange 148, respectively.

Figure 21:
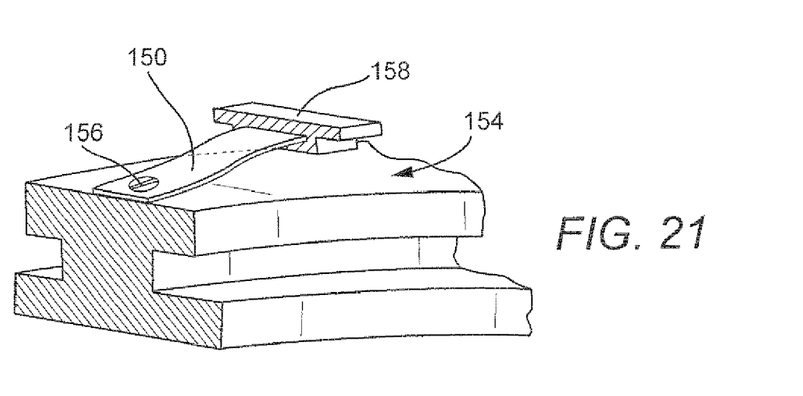
FIG. 21 is a partial perspective view of a spring segment in accordance with a seventh exemplary but nonlimiting embodiment.
Figure 22:
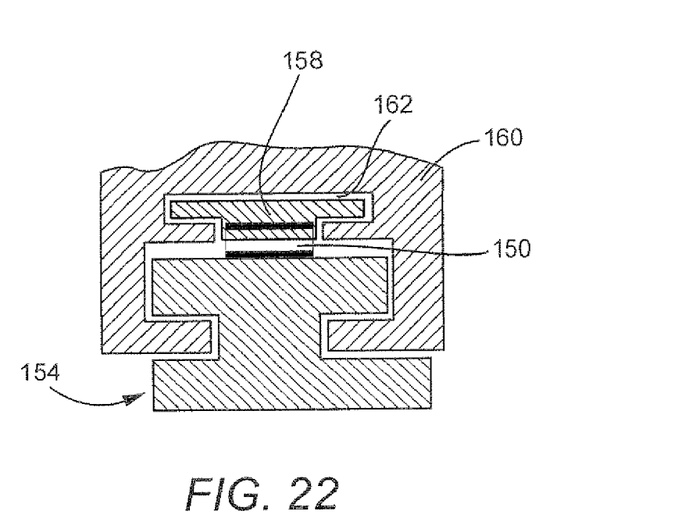
FIG. 22 is a cross-section of the arrangement shown in FIG. 21.
Figure 23:
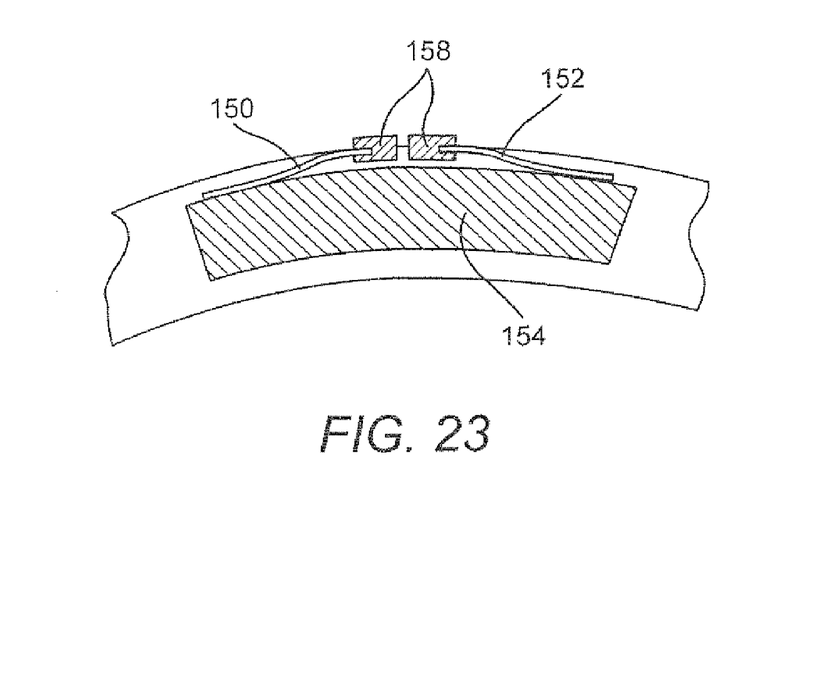
FIG. 23 is an end view of the arrangement shown in FIG. 22.
Figure 24:
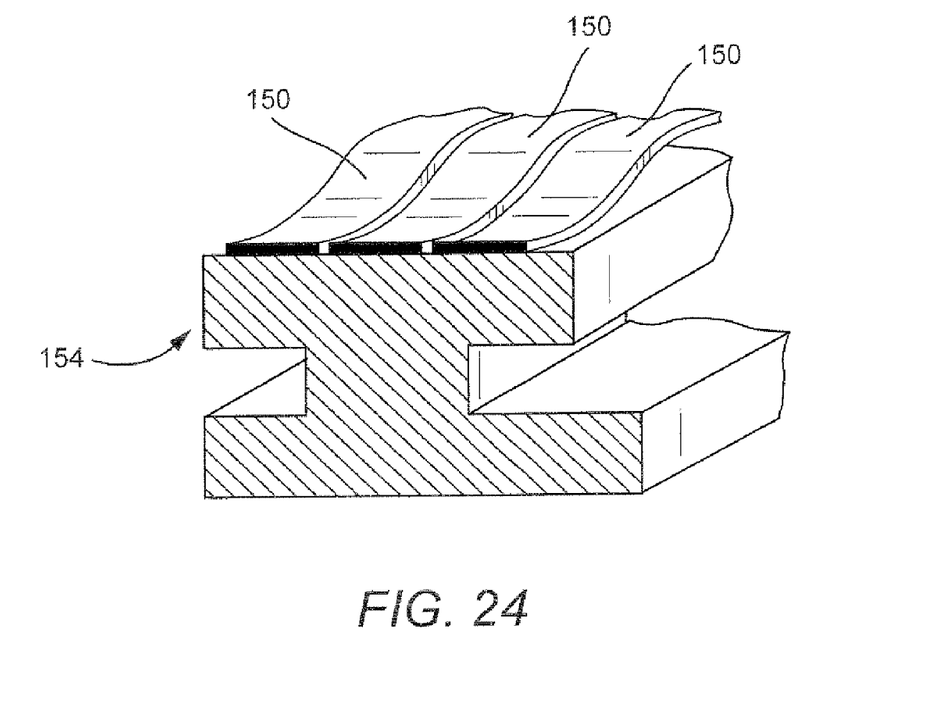
FIG. 24 is a partial perspective view of an arrangement similar to FIG. 22 but with plural side-by-side springs.

FIGS. 21-23 illustrate another embodiment wherein a pair of metal strip springs 150, 152 are each connected at one end to the top of the packing segment 154, for example, by spot welding or with one or more fasteners 156. The opposite ends of the strips are fixed within T-shaped attachments 158 within the packing casing 160. As perhaps best understood from FIGS. 22 and 23, the T-shaped attachments 158 are slidably movable within corresponding slots 162 in the stator housing, such that the packing ring is effectively suspended through the springs. In addition to the T-shape, other shapes for attachments 158, such as dovetail shapes, may be used. Multiple pairs of side-by-side springs 150 may be used as shown in FIG. 24 to achieve the desired stiffness and displacements.

Where metal strip or leaf springs are utilized, the spring may either be of uniform or varying cross-section. By varying the cross-section of the strip or leaf spring non-linear forced displacement characteristics that may be desirable in certain retractable seal designs may be realized As indicated above, the seal arrangements described herein are applicable to various known seal configurations including but not limited to labyrinth packings (including straight tooth, slant tooth and Vernier packings), brush seals, compliant plate seals, shingle seals, honeycomb seals, and abradable seals. The seal arrangements are also applicable at any sealing location including but not limited to end packings, inter-stage sealing, tip sealing, etc., and is inclusive of annular, non-segmented axially movable seals.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A spring assembly for a retractable turbine rotor seal supported in an arcuate segment comprising:
   a first radially inner restraining plate having a lower surface adapted to engage a surface of a turbine stator, and a flat upper surface provide with an upstanding hub;
   a second radially outer restraining plate having a flat lower surface and an upper surface adapted to engage a surface of the arcuate segment, said second radially outer restraining plate formed with an opening receiving said upstanding hub; and
   at least one spring telescoped over said upstanding hub and exerting a radially outward biasing force on said second radially outer restraining plate, and adapted to exert a radially outward retracting force on said arcuate segment.

2. The spring assembly of claim 1 wherein said at least one spring comprises a disc spring.

3. The spring assembly of claim 1 wherein said at least one spring comprises a plurality of disc springs arranged in series or in parallel.

4. The spring assembly of claim 1 wherein one of said first and second restraining plates is provided with an upstanding projection and the other of said first and second restraining plates is provided with an opening located to align and receive said upstanding projection to thereby prevent relative rotation between said first radially inner and said second radially outer restraining plates.

5. A spring assembly for a retractable turbine rotor seal supported in an arcuate segment comprising:
   a radially inner spring carrier plate having a radially inner surface adapted to engage a surface of a turbine stator, and a radially outer surface having a recess formed therein;
   at least one spring seated in said recess; and
   a button plate supported on said one or more springs, said button plate having a radially outer surface adapted to engage a surface of the arcuate segment, wherein said at least one spring exerts a radially outward force on said button plate and is adapted to exert a radially outward force on said arcuate segment.

6. The spring assembly of claim 5 wherein said at least one spring comprises a disc spring.

7. The spring assembly of claim 5 wherein said at least one spring comprises a plurality of disc springs arranged in series or in parallel.

8. The spring assembly of claim 5 wherein said button plate is sized to fit within said recess.

9. The spring assembly of claim 5 wherein said button plate has a thickness chosen to achieve a predetermined spring preload.

10. A turbine rotor and stator assembly incorporating a retractable seal, the assembly comprising:
    a turbine stator formed with an annular slot defined in part by opposed hooks forming a relatively narrow neck providing an entry to said annular slot; a plurality of arcuate seal segments, each arcuate seal segment having a mounting flange seated in said slot and a sealing face located exteriorly of said slot and supporting a plurality of seal elements, said plurality of arcuate seal segments adapted to move radially toward and away from said rotor; and wherein each arcuate seal segment is biased in a radially outward direction by plural leaf or strip springs engaged between said each arcuate seal segment and said turbine stator.

11. The turbine rotor and stator assembly of claim 10 wherein said plural leaf or strip springs comprise plural leaf springs on opposite sides of said mounting flange, said leaf springs each having opposite ends secured to a respective one of said sides, and a middle portion engaged with an adjacent one of said opposed hooks.

12. The turbine rotor and stator assembly of claim 11 wherein one of said opposite ends is provided with a pin slidable within a slot formed in said respective one of said sides.

13. The turbine rotor and stator assembly of claim 11 wherein said middle portion is woven between circumferentially spaced pins extending from said respective one of said sides.

14. The turbine rotor and stator assembly of claim 10 wherein said plural leaf or strip springs comprise at least one wavy spring engaged between each of said opposed hooks and said mounting flange.

15. The turbine rotor and stator assembly of claim 10 wherein said plural leaf or strip springs comprise at least one pair of circumferentially-aligned metal leaf or strip springs, each engaged between a radially outer surface of said mounting flange and a respective attachment to said stator.

16. The turbine rotor and stator assembly of claim 15 wherein said respective attachments for each of said springs are arranged in back-to-back relationship, between opposite ends of said segment.

17. The turbine rotor and stator assembly of claim 15 wherein said at least one pair of circumferentially-aligned metal leaf or strip springs comprise at least two pair of laterally adjacent, and circumferentially-aligned metal leaf or strip springs.

18. The turbine rotor and stator assembly of claim 16 wherein said respective attachments are slidable within slots in said stator.

* * * * *